United States Patent [19]

Almada

[11] Patent Number: 4,949,939
[45] Date of Patent: Aug. 21, 1990

[54] GATE VALVES WITH SEAT PROTECTORS

[76] Inventor: Edward M. Almada, 7537 Linden St., Hammond, Ind. 46324

[21] Appl. No.: 320,615

[22] Filed: Mar. 8, 1989

[51] Int. Cl.$^5$ ............................ F16K 3/30; F16K 3/12
[52] U.S. Cl. .................................... 251/328; 251/327; 251/326
[58] Field of Search .................. 251/326, 327, 328; 137/375

[56] References Cited

U.S. PATENT DOCUMENTS

| 564,378 | 7/1896 | Jennings | 126/99 R |
|---|---|---|---|
| 880,463 | 2/1908 | Paul | 251/328 |
| 903,354 | 11/1908 | Brown | 126/144 |
| 1,617,503 | 2/1927 | Seymour et al. | 251/248 |
| 2,031,151 | 2/1936 | Eulberg | 251/326 X |
| 2,221,921 | 11/1940 | Le Beau, Jr. | 251/328 |
| 2,292,780 | 2/1940 | Benoit | 251/327 |
| 2,678,802 | 12/1950 | Adams | 251/328 |
| 2,793,831 | 5/1957 | Doster | 251/328 X |
| 2,845,954 | 8/1958 | Hamer | 251/327 X |
| 2,908,480 | 10/1959 | Hamer | 251/328 |
| 2,931,394 | 4/1960 | Hamer | 251/328 X |
| 3,017,158 | 1/1962 | Hansen et al. | 251/327 X |
| 3,356,334 | 5/1965 | Scaramucci | 251/327 X |
| 3,662,778 | 5/1972 | Leopold, Jr. et al. | 137/375 |
| 4,316,483 | 2/1982 | Jandrasi | 137/375 X |
| 4,532,957 | 8/1985 | Battle et al. | 137/375 |
| 4,541,453 | 9/1985 | Graf | 251/328 X |

Primary Examiner—John Rivell
Attorney, Agent, or Firm—Oliff & Berridge

[57] ABSTRACT

A gate valve includes:
(1) an inlet;
(2) an outlet;
(3) wall means for defining a flow path between the inlet and the outlet;
(4) a bonnet wall which defines a bonnet space; and
(5) at least one valve seat.

A gate is selectively movable between a first gate position, in which the gate is retracted away from the valve seat and the inlet communicates with the outlet, and a second gate position, in which the gate contacts the valve seat, thereby preventing flow from the inlet to the outlet, the gate having a seal surface which contacts the valve seat when the gate is in the second gate position. At least one valve seat protector is selectively movable between a first seat protector position, in which the valve seat protector covers the valve seat, and a second seat protector position, in which the valve seat protector is retracted away from the valve seat. The gate is movable between the first and second gate positions and the seat protector is movable between the first and second seat protector positions.

29 Claims, 6 Drawing Sheets

Fig_1

GATE VALVES WITH SEAT PROTECTORS

BACKGROUND OF THE INVENTION

1. Field of the Invention

The present invention relates to gate valves having a movable gate selectively engageable with at least one valve seat to prevent flow through the valve, and at least one movable seat protector which selectively covers the valve seat.

2. Description of Related Art

In a gate valve, passage of fluid or material through the valve is controlled by selective movement of a gate into and away from contact with at least one valve seat. In the course of normal use, the valve seat typically becomes eroded, worn and/or corroded, requiring replacement.

Various attempts have been made to improve gate valves by overcoming or avoiding the deterioration of the valve seats. It has been proposed to provide removable valve seats which may be replaced without replacing the entire valve. For example, removable seat rings have been constructed which have an externally threaded portion which engages with internal threading in the wall of the flow path adjacent to the valve seat. Such gate valves have been found to be unsatisfactory, in that breakdown of removable valve seats often still requires replacement of the entire valve.

SUMMARY OF THE INVENTION

The present invention is directed to a valve in which permanent or removable valve seats are protected, thereby extending the useful life of the valve seats and the valves themselves.

The valves according to this invention comprise:
(a) a valve body comprising:
 (1) an inlet;
 (2) an outlet;
 (3) wall means for defining a flow path between the inlet and the outlet;
 (4) a bonnet wall which defines a bonnet space;
 (5) at least one valve seat;
(b) a gate movable between a first gate position, in which the gate is retracted away from the valve seat and the inlet communicates with the outlet, and a second gate position, in which the gate contacts the valve seat, thereby preventing flow from the inlet to the outlet, the gate having a seal surface which contacts the valve seat when the gate is in the second gate position;
(c) at least one valve seat protector movable between a first seat protector position, in which the valve seat protector covers the valve seat and a second seat protector position, in which the valve seat protector is retracted away from the valve seat;
(d) means for selectively moving the gate between the first and second gate positions;
(e) means for selectively moving the seat protector between the first and second seat protector positions.

The valve may comprise means for causing the valve seat protector to move from the first seat protector position to the second seat protector position when the gate is moved from the first gate position to the second gate position and for causing the valve seat protector to move from the second seat protector position to the first seat protector position when the gate is moved from the second gate position to the first gate position.

In one embodiment, the valve seat protector has a strap which passes around a pulley means and is attached to a pin provided on the gate.

In a second embodiment, the means for moving the seat protector comprises a seat protector lever attached on one end to the seat protector and on the other end to a lever stem, the lever stem being rotatably mounted in the wall of the body and rigidly attached to an actuation lever.

BRIEF DESCRIPTION OF THE DRAWINGS

Preferred embodiments of the invention will be described herein in detail with reference to the appended drawings in which like elements bear like reference numerals, and wherein.

DETAILED DESCRIPTION OF THE PREFERRED EMBODIMENTS

The gate valves according to the present invention include a movable gate which selectively contacts at least one valve seat to prevent flow through the valve, and at least one movable seat protector which selectively covers the valve seat.

Figure 1:
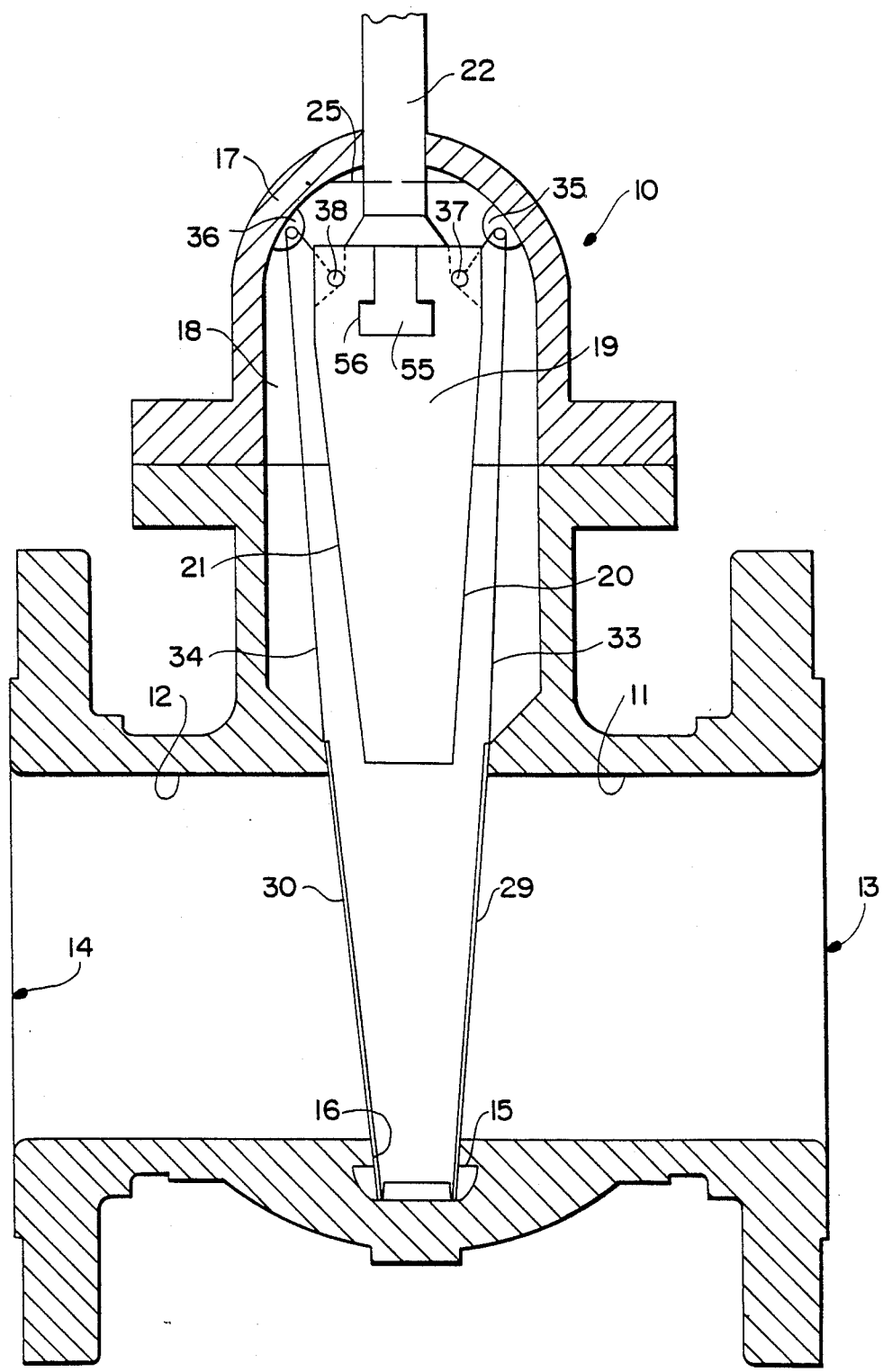
FIG. 1 is a sectional view showing a first embodiment in accordance with the present invention.

FIG. 1 illustrates a first embodiment of a gate valve in accordance with the present invention. A valve body 10 includes an inlet wall means 11, an outlet wall means 12, the wall means 11 and 12 defining a flow path between an inlet 13 and an outlet 14. The inlet wall means 11 and outlet wall means 12 are preferably cylindrical, defining a cylindrical flow path into and out of the gate valve. The valve body 10 also includes an upstream valve seat 15 and a downstream valve seat 16. In the embodiment shown in FIG. 1, the valve seats 15 and 16 comprise annular surfaces. The valve body 10 also includes a bonnet wall 17 which defines a bonnet space 18.

Figure 2:
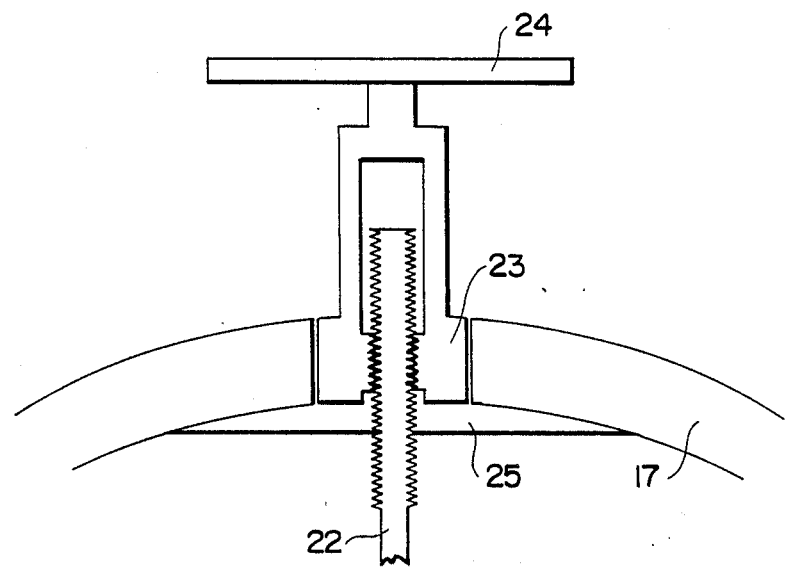
FIG. 2 is a perspective view of the gate stem and a portion of the bonnet shown in FIG. 1.

The gate valve includes a gate 19 having an upstream seal surface 20 and a downstream seal surface 21. The gate 19 is connected to a stem 22 which is adapted to be raised and lowered relative to the bonnet wall 17. The stem 22 preferably has an extension portion 55 which fits within a corresponding bore 56 formed in the gate 19. In the embodiment shown in FIG. 2, the stem 22 has threads which engage threads in a stem nut 23 which is rigidly attached to a handwheel 24 and rotatably mounted in the bonnet wall 17. When the handwheel 24 is rotated, the stem 22 and the gate 19 are raised or lowered, depending on the direction of rotation. A suitable sealing means 25 is provided to seal the stem 22 and the bonnet wall 17.

Alternatively, the stem 22 may be slidably mounted in the bonnet wall and connected to a lever for raising and lowering the stem and the gate. Any other suitable means for raising and lowering the gate may be employed.

At the lowermost position of the gate 19, the upstream and downstream seal surfaces 20 and 21 are in contact with the upstream and downstream valve seats 15 and 16, respectively, thereby preventing flow between the inlet 13 and the outlet 14. In its uppermost position (shown in FIG. 1), the gate 19 is fully within the bonnet space 18 and fluid can freely flow between the inlet 13 and the outlet 14.

Figure 8:
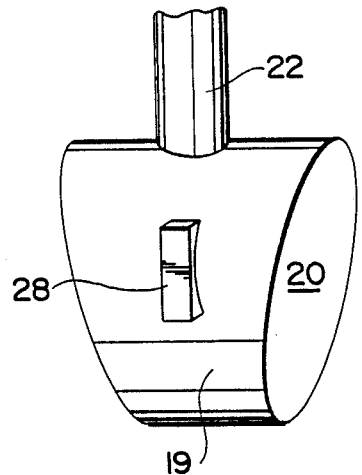
FIG. 8 is a perspective view of the gate in the first and second embodiments.

Referring to FIG. 8, the gate 19 is preferably further provided with at least one engagement means 28 which engages an internal surface of the valve body 10 to guide the gate 19 as it moves up and down.

Figure 3:
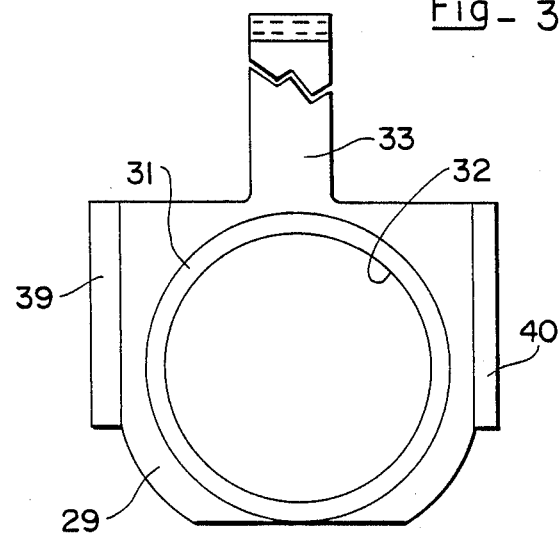
FIG. 3 is a front view of a seat protector shown in FIG. 1.

The gate valve shown in FIG. 1 is further provided with an upstream seat protector 29 and a downstream seat protector 30 (see FIG. 3). The seat protectors 29 and 30 are preferably each made of hardened steel with a valve seat contact area 31 which comprises a plastic coating or other suitable material. A hole 32 is provided in each of the seat protectors 29 and 30. The hole 32 preferably corresponds to the cross-section of the flow path. The seat protectors 29 and 30 are movable between a first seat protector position (shown in FIG. 1), in which the valve seat contact areas 31 of the seat protectors 29 and 30 are in contact with the valve seats 15 and 16, respectively, and a second seat protector position, in which the seat protectors 29 and 30 are within the bonnet space 18. When the seat protectors 29 and 30 are in the first seat protector position, fluid can flow through the hole 32 in each of the seat protectors 29 and 30 and the seat protectors 29 and 30 protect the valve seats 15 and 16 from erosion and wear.

In the embodiment shown in FIG. 1, the seat protectors 29 and 30 include straps 33 and 34, respectively, which pass around pulleys 35 and 36 mounted on the bonnet wall 17. The straps 33 and 34 are attached to pins 37 and 38, respectively, provided on the gate 19. Accordingly, as the gate 19 is lowered, the seat protectors 29 and 30 are raised, and as the gate 19 is raised, the seat protectors 29 and 30 are lowered.

Referring to FIG. 3, each of the seat protectors 29 and 30 is provided with offset portions 39 and 40 which engage seat protector guide grooves formed in the valve body 10 to guide the seat protectors 29 and 30 as they are raised and lowered. Guide grooves with which the offset portions 39 and 40 engage can be provided in inserts fitted into the valve body 10.

Alternatively, other means may be provided for raising and lowering the seat protectors 29 and 30, which may or may not be adapted such that lowering the gate 19 causes the seat protectors 29 and 30 to be raised and vice-versa.

Figure 4:
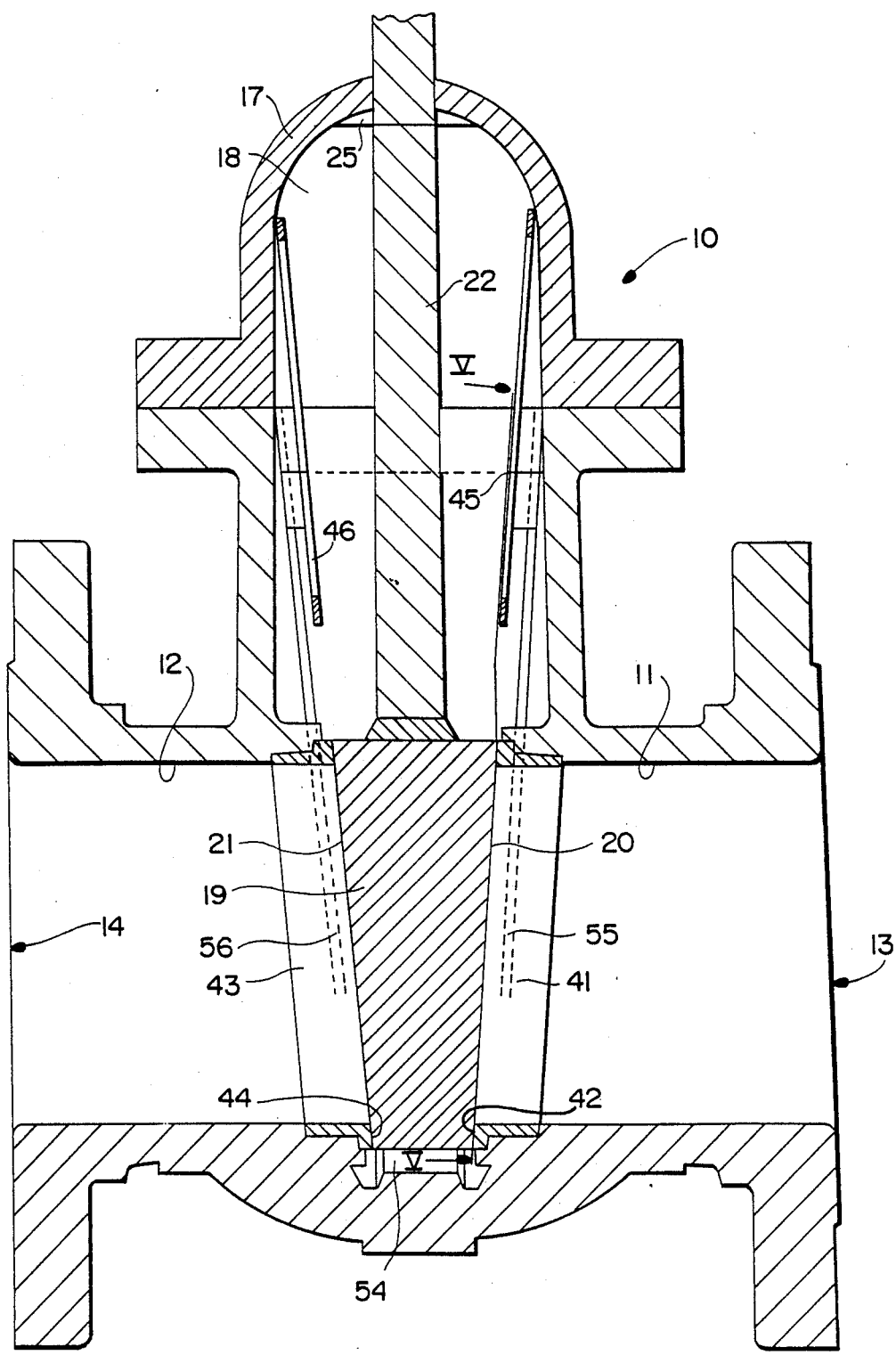
FIG. 4 is a sectional view of a second embodiment in accordance with the present invention in which the gate is in the lower position.

A second embodiment in accordance with the present invention is shown in FIG. 4, in which structure which corresponds to structure shown in FIG. 1 is identified by like reference numerals. In FIG. 4, the gate 19 is in the lower position, thus preventing flow from the inlet 13 to the outlet 14. The gate valve of FIG. 4 is provided with an upstream valve seat insert 41 which has an upstream seat face 42, and a downstream valve seat insert 43 which has a downstream seat face 44. When the gate 19 is in the lower position, the upstream seal surface 20 is in contact with the upstream seat face 42 and the downstream seal surface 21 is in contact with the downstream seat face 44, such that flow is prevented from the inlet 13 to the outlet 14.

The gate valve shown in FIG. 4 also includes an upstream seat protector 45 and a downstream seat protector 46 which can be moved up and down by actuation of seat protector moving means (not shown in FIG. 4). The seat protectors 45 and 46 are generally formed as described above and as shown in FIG. 3, except that the seat protectors 45 and 46 do not have a strap, designated by reference numeral 33 in FIG. 3. The offset portions 39 and 40 of the seat protectors 45 and 46 engage seat protector guide grooves 55 and 56.

Figure 5:
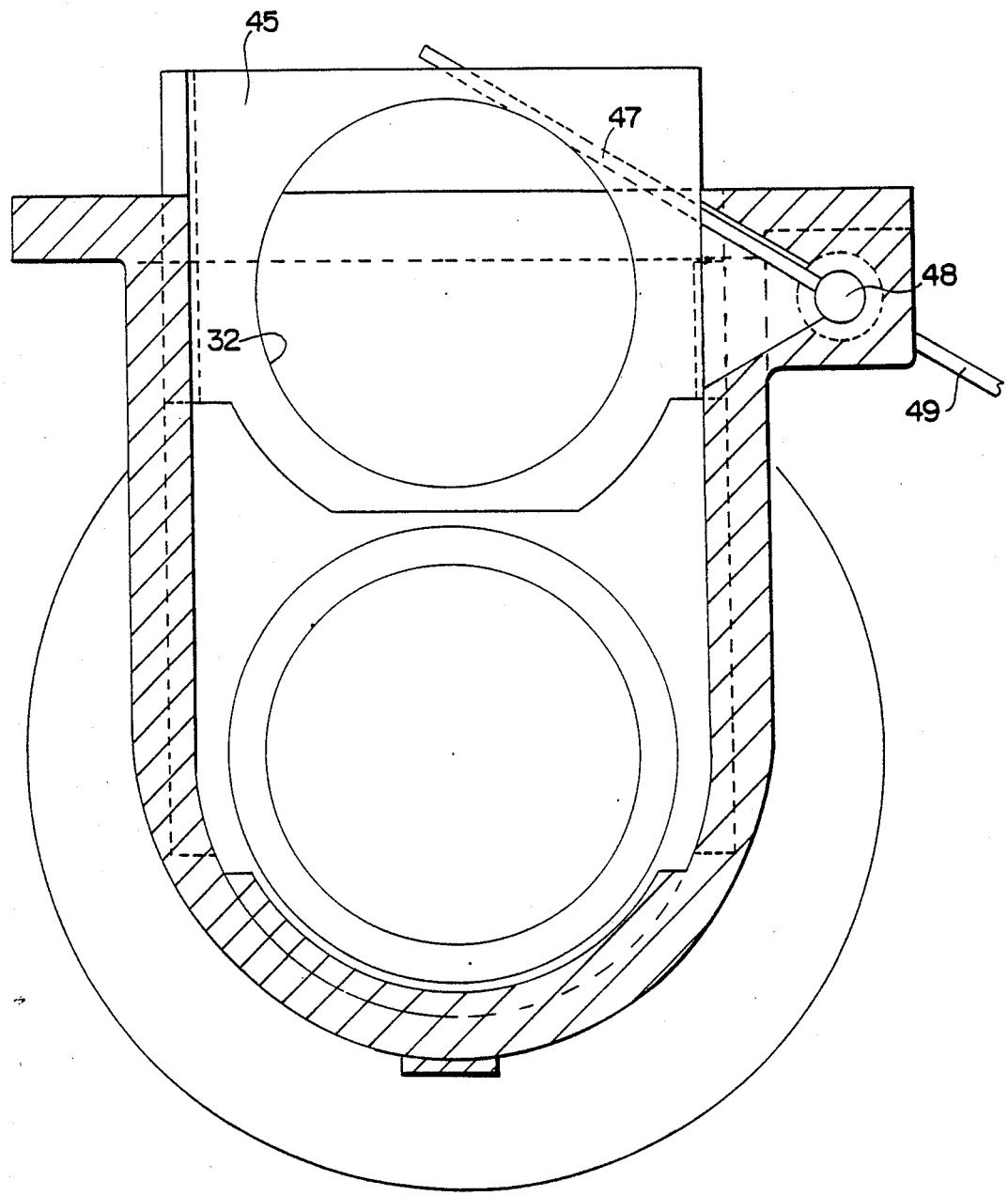
FIG. 5 is a sectional view taken along line V—V of FIG. 4.

A preferred seat protector moving means is shown in FIG. 5. A seat protector lever 47 is rigidly attached to the seat protector 45 and to a lever stem 48 rotatably mounted in the body wall (see FIG. 6). The stem 48 can be rotated about its axis to move the seat protector lever 47 by moving an acutation lever 49 which extends externally of the body wall.

Figure 6:
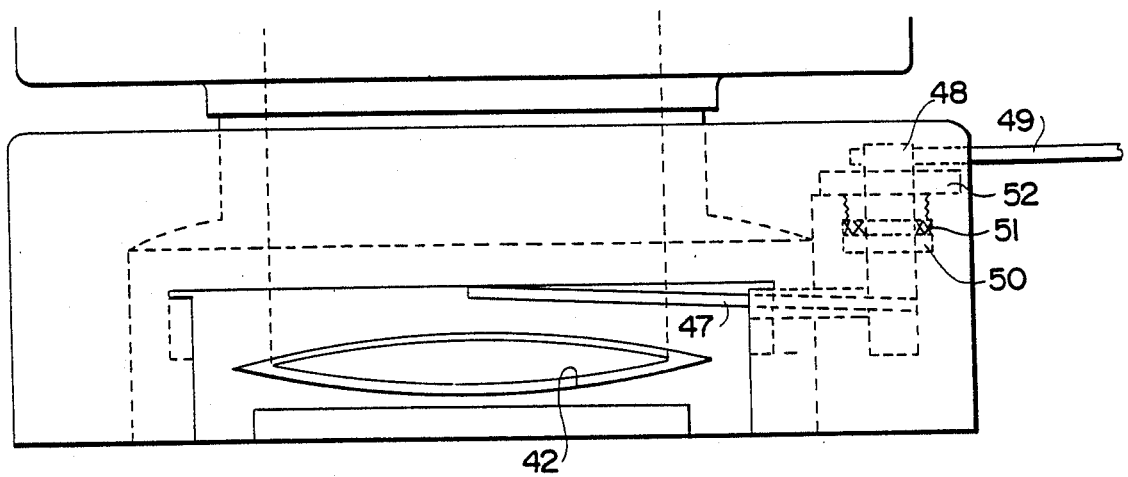
FIG. 6 is a top cut-away view of the embodiment shown in FIG. 4.

Referring to FIG. 6, the lever stem 48 includes a collar portion 50 which fits in a counterbore formed in the body wall. Mounted on the lever stem 48 is a packing gland nut 52 which is threaded into the counterbore for the lever stem 48. Tightening of the packing gland nut 52 pushes the packing 51 toward the collar portion 50 to hold the operating pressure of the valve.

In FIG. 5, if the lever 49 is pushed upwardly, the seat protector 45 is moved downwardly toward the valve seat 42 to the first seat protector position (shown in FIG. 4).

Referring to FIG. 4, the seal surfaces 20 and 21 define seal surface angles relative to the axis of the stem 22. The seal surface angle of each of the seal surfaces 20 and 21 is preferably about 5°.

The seat protectors 45 and 46 define seat protector angles relative to the stem 22. The seat protectors are preferably parallel to the corresponding seal surfaces so that the seat protectors 45 and 46 do not interfere with the gate 19 as the gate 19 and the seat protectors 45 and 46 are moved up and down. By providing seat protectors at angles equal to the corresponding seal surface angles, the actuation levers 49 on either side of the stem handwheel 24 can be rapidly actuated without interfering with operation of the handwheel 24.

Figure 7:
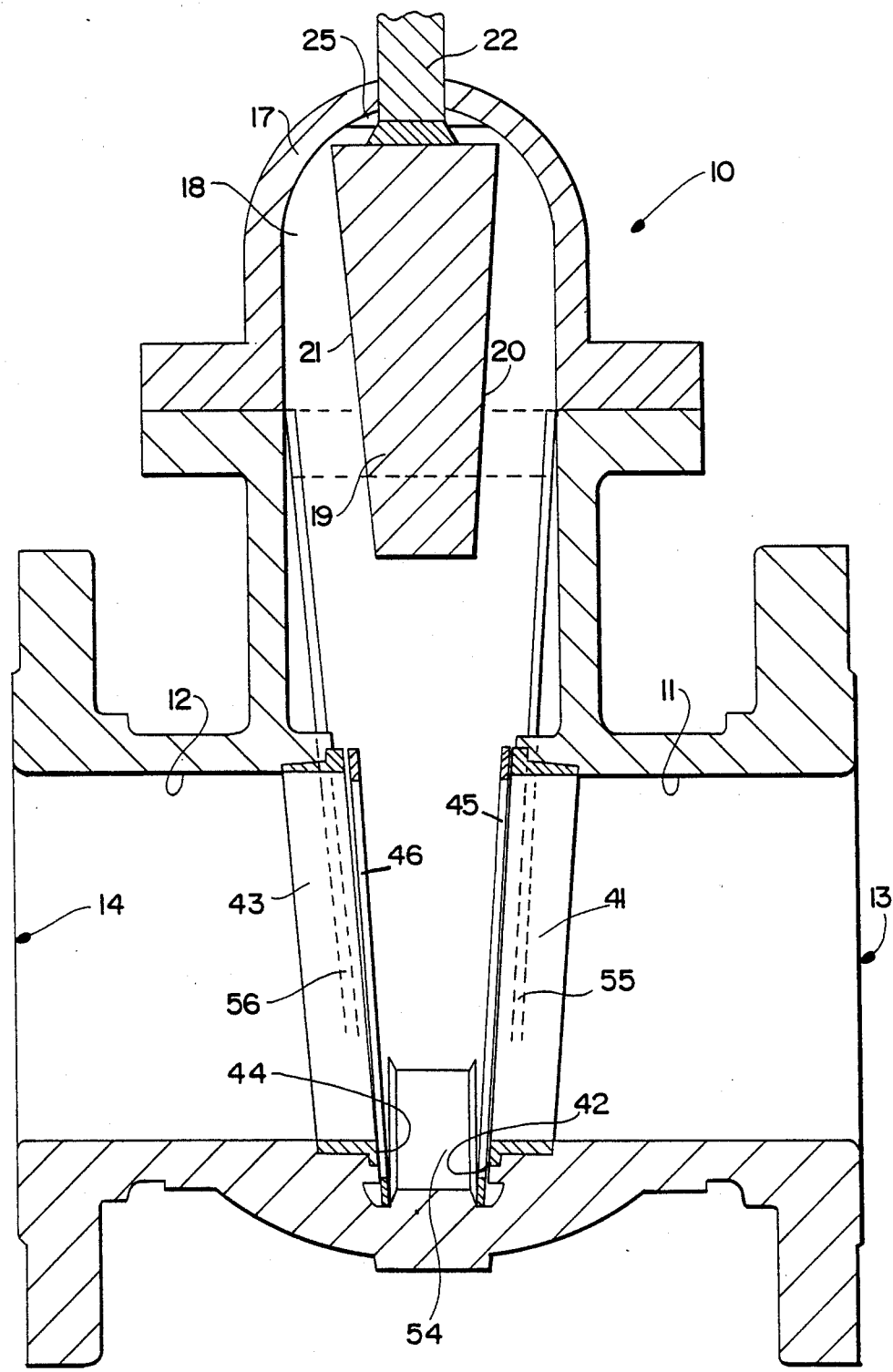
FIG. 7 is a sectional view of the embodiment shown in FIG. 4 with the gate in the raised position.

An angle right 54 is positioned in the bottom of the gate valve. The angle right 54 can be more easily seen in FIG. 7, which corresponds to the embodiment shown in FIG. 4, but in which the gate 19 is in the raised position and the seat protectors 45 and 46 are in the second seat protector position. The angle right 54 is positioned such that as the seat protectors 45 and 46 are lowered, the bottom edges thereof contact the angle right 54 and are pushed in the direction of the valve seats 42 and 44, respectively, such that the seat protectors 45 and 46 cover the valve seats 42 and 44.

The valve body and the gate may be formed of any suitable material, for example, any formable metal or plastic.

The embodiments shown above disclose valves which include valve seat protectors which protect the valve seats and extend the useful lives of the valve seats and the valves themselves. The seat protectors according to the present invention can be constructed such that they can be easily removed and replaced without having to replace the valve seats.

Although the valves in accordance with the present invention have been described in connection with preferred embodiments, it will be appreciated by those skilled in the art that additions, modifications, substitutions and deletions not specifically described may be made without departing from the spirit and scope of the invention defined in the appended claims.

What is claimed is:

1. A valve comprising:
   an inlet;
   an outlet;
   wall means for defining a flow path between said inlet and said outlet;
   a gate selectively movable between a first gate position and a second gate position, said inlet communicating with said outlet when said gate is in said first gate position;
   at least one valve seat, said gate contacting said valve seat when in said second gate position, thereby preventing flow between said inlet and said outlet;
   at least one valve seat protector selectively movable between a first seat protector position and a second seat protector position, said valve seat protector covering said valve seat when in said first seat protector position, said valve seat protector being retracted away from said valve seat when in said second seat protector position; and
   seat protector moving means for causing said seat protector to move from said first seat protector position to said second seat protector position when said gate is moved from said first gate position to said second gate position and for causing said valve seat protector to move from said second seat protector position to said first seat protector position when said gate is moved from said second gate position to said first gate position, said seat protector moving means comprising a strap attached at one end to said seat protector, the strap passing around a pulley and being attached at its other end to said gate.

2. The valve of claim 1, wherein said seat protector is formed of hardened steel and has a valve seat contact area which covers said valve seat when said seat protector is in said first seat protector position.

3. The valve of claim 1, wherein said seat protector has front and back seat protector surfaces which are substantially parallel to a surface of said gate and a surface of said valve seat.

4. The valve of claim 1, wherein said seat protector comprises a seat protector surface which is parallel to a surface of said gate.

5. A valve comprising:
   (a) a valve body comprising:
       (1) an inlet;
       (2) an outlet;
       (3) wall means for defining a flow path between said inlet and said outlet;
       (4) a bonnet wall which defines a bonnet space;
       (5) a first valve seat and a second valve seat;
   (b) a gate movable between a first gate position, in which said gate is retracted away from said valve seats and said inlet communicates with said outlet, and a second gate position, in which said gate contacts said valve seats, thereby preventing flow from said inlet to said outlet, said gate having first and second seal surfaces which contact said first and second valve seats, respectively, when said gate is in said second gate position;
   (c) first and second valve seat protectors selectively movable between a first seat protector position, in which said first and second valve seat protectors cover said first and second valve seats, respectively, and a second seat protector position, in which said first and second valve seat protectors are retracted away from said valve seats, said valve seat protectors including seat protector straps, said first valve seat protector having front and back first seat protector surfaces which are substantially parallel to one another and to said first seal surface of said gate, said second valve seat protector having front and back second seat protector surfaces which are substantially parallel to one another and to said second seal surface of said gate; and
   (d) means for selectively moving said gate between said first and second gate positions.

6. The valve of claim 5, further comprising first and second seat protector moving means each including a seat protector lever attached on one end to said seat protector and on its other end to a lever stem, said lever stem being rotatably mounted in a wall of said valve body and rigidly attached to an actuation lever.

7. The valve of claim 5, wherein said flow path is circular.

8. The valve of claim 7, wherein said valve seats comprise annular surfaces.

9. The valve of claim 5, wherein said valve seats comprise seat faces provided on valve seat inserts, said first and second seal surfaces contacting said seat faces when said gate is in said second gate position.

10. The valve of claim 5, wherein said seat protectors are formed of hardened steel and have valve seat contact areas which cover said valve seats when said seat protectors are in said first seat protector position.

11. The valve of claim 10, wherein said valve seat contact areas comprise plastic coatings on said seat protectors.

12. The valve of claim 5, wherein said seat protectors are provided with offset portions which engage structure in said valve body to guide said seat protectors as they are moved between said first and second seat protector positions.

13. The valve of claim 5, further comprising plastic guides positioned within said valve body, and said seat protectors being provided with offset portions which engage said plastic guides.

14. The valve of claim 5, further comprising seat protector moving means comprising a strap attached at one end to said seat protector, the strap passing around a pulley and being attached at its other end to said gate.

15. A valve comprising:
   (a) a valve body comprising:
       (1) an inlet;
       (2) an outlet;
       (3) wall means for defining a flow path between said inlet and said outlet;
       (4) a bonnet wall which defines a bonnet space;
       (5) at least one valve seat;
   (b) a gate movable between a first gate position, in which said gate is retracted away from said valve seat and said inlet communicates with said outlet, and a second gate position, in which said gate contacts said valve seat, thereby preventing flow from said inlet to said outlet, said gate having a seal surface which contacts said valve seat when said gate is in said second gate position;
   (c) at least one valve seat protector movable between a first seat protector position, in which said valve seat protector covers said valve seat and a second seat protector position, in which said valve seat protector is retracted away from said valve seat;

(d) means for selectively moving said gate between said first and second gate positions;

(e) means for selectively moving said seat protector between said first and second seat protector positions, said seat protector moving means including a seat protector lever attached on one end to said seat protector and on the other end to a lever stem, the lever stem being rotatably mounted in said valve body and being rigidly attached to an actuation lever.

16. The valve of claim 15, wherein said flow path is circular.

17. The valve of claim 16, wherein said valve seat comprises an annular surface.

18. The valve of claim 15, wherein said valve seat comprises a seat face provided on a valve seat insert, said seal surface contacting said seat face when said gate is in said second gate position.

19. The valve of claim 15, wherein said seat protector is formed of hardened steel and has a valve seat contact area which covers said valve seat when said seat protector is in said first seat protector position.

20. The valve of claim 19, wherein said valve seat contact area comprises a plastic coating on said seat protector.

21. The valve of claim 15, wherein said seat protector is provided with an offset portion which engages structure in said valve body to guide said seat protector as it is moved 22. The valve of claim 15, further comprising a plastic guide positioned within said valve body, and said seat protector being provided with an offset portion which engages said plastic guide.

23. The valve of claim 15, wherein said lever stem includes a collar portion which fits in a counterbore formed in said valve body, the valve further comprising a packing gland nut and packing positioned on said lever stem to seal the lever stem and the valve body.

24. The valve of claim 23, wherein said packing gland is threaded into counterbore for said lever stem, such that tightening of said packing gland nut pushes said packing toward said collar portion.

25. The valve of claim 15, wherein a surface of said seat protector is parallel to said seal surface.

26. The valve of claim 25, wherein said seal surface defines an angle of about 5° relative to an axis of said stem.

27. The valve of claim 15, wherein said seal surface defines an angle of about 5° relative to an axis of said stem.

28. The valve of claim 15, further comprising an angle right, positioned such that as said seat protector is moved toward said first seat protector position, an edge of said seat protector contacts said angle right, thereby pushing said edge toward said valve seat, such that said seat protector covers said valve seat.

29. The valve of claim 15, wherein said seat protector comprises a seat protector surface which is parallel to a surface of said gate.

* * * * *